Figure 1:
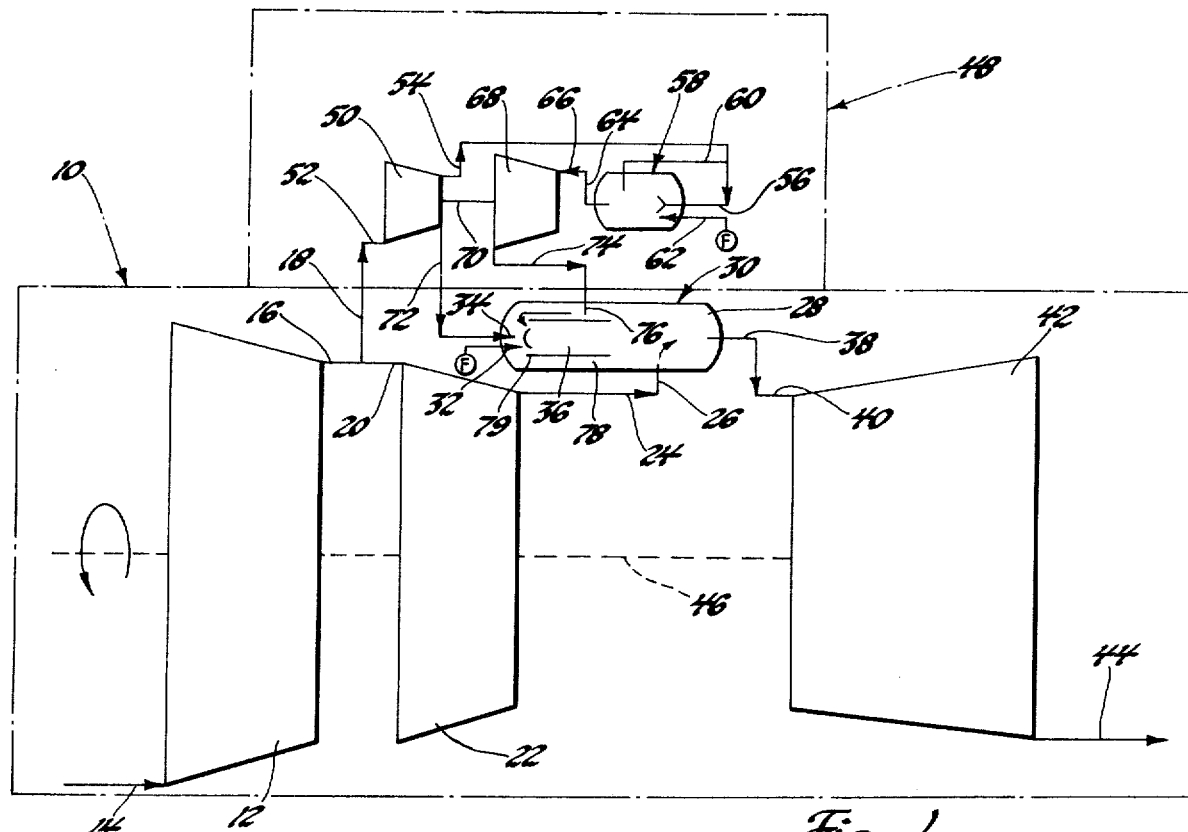

United States Patent
Quinn

[11] 3,901,026
[45] Aug. 26, 1975

[54] GAS TURBINE WITH AUXILIARY GASIFIER ENGINE

[75] Inventor: Ronald E. Quinn, Indianapolis, Ind.

[73] Assignee: General Motors Corporation, Detroit, Mich.

[22] Filed: Nov. 5, 1973

[21] Appl. No.: 412,749

[52] U.S. Cl. ............ 60/39.16; 60/39.15; 60/39.17; 60/39.65; 60/DIG. 11
[51] Int. Cl. .......................... F02c 7/02; F02g 3/00
[58] Field of Search ............ 60/39.17, 39.16, 39.65, 60/DIG. 11, 39.15

[56] References Cited
UNITED STATES PATENTS

| | | | |
|---|---|---|---|
| 2,653,443 | 9/1953 | Mercier et al. | 60/39.17 |
| 2,787,886 | 4/1957 | Wood | 60/39.17 |
| 2,988,884 | 6/1961 | Pouit | 60/39.17 |
| 3,541,790 | 11/1970 | Kellett | 60/DIG. 11 |
| 3,754,393 | 8/1973 | Handa | 60/DIG. 11 |
| 3,792,581 | 2/1974 | Handa | 60/39.65 |

FOREIGN PATENTS OR APPLICATIONS 954,714    6/1949    France ..................... 60/39.17

Primary Examiner—C. J. Husar
Assistant Examiner—Thomas I. Ross
Attorney, Agent, or Firm—J. C. Evans

[57] ABSTRACT

A gas turbine engine including an auxiliary gasifier engine having an input air supply thereto provided from an intermediate bleed from the main engine compressor and including an auxiliary combustor and an auxiliary turbine for producing a combustion gas supply to a main combustion chamber having a primary and a secondary zone therein with the combustion gas supply producing recirculation air flow to mix a secondary air supply from the main compressor with the fuel supply to reduce emissions from the main combustion chamber.

3 Claims, 2 Drawing Figures

PATENTED AUG 26 1975

3,901,026

GAS TURBINE WITH AUXILIARY GASIFIER ENGINE

This invention relates to gas turbine engines and more particularly to emission control systems for gas turbine engines.

In order to reduce exhaust emission from gas turbine engines, it is desirable to obtain a very high ratio of recirculated air to primary air in the engine combustor. It has been proposed to enhance recirculation of air by various momentum transfer devices for example, jet entrainment. However, the momentum requirements for pumping jets to produce entrainment, are substantial as compared to the momentum loss of the main air flow when passing through a well designed combustor. Thus, an excessive overall combustor pressure loss can be produced when using a common pressure source for the jet entrainment and the combustion air.

Accordingly, an object of the subject invention is to supply combustion gases to a combustor at a total pressure higher than the main engine compressor discharge pressure to produce combustor recirculation without momentum losses produced by present system for recirculation of air in a gas turbine engine combustor.

Another object of the present invention is to use a small auxiliary engine as a gasifier to supply main combustor combustion gases at a total pressure higher than a main engine compressor discharge pressure to reduce momentum losses in the engine combustor of a gas turbine engine while improving recirculation flow patterns therein for reducing emissions.

Still another object of the present invention is to reduce emissions in a combustor of a main gas turbine engine by producing an auxiliary output pressure for recirculation flow in the combustor by means of an auxiliary compressor having a pressure ratio higher than that of the main engine compressor stages past a bleed point for supplying air from the main compressor to the auxiliary compressor and heating the auxiliary engine airflow to produce the auxiliary output pressure; and if desired discharging auxiliary compressor discharge air flow directly to the primary zone of the main engine combustor to produce air blast fuel atomization and enhanced recirculation of combustor gases and fuel in the main engine combustor.

Further objects and advantages of the present invention will be apparent from the following description, reference being had to the accompanying drawing wherein a preferred embodiment of the present invention is clearly shown.

Figure 2:
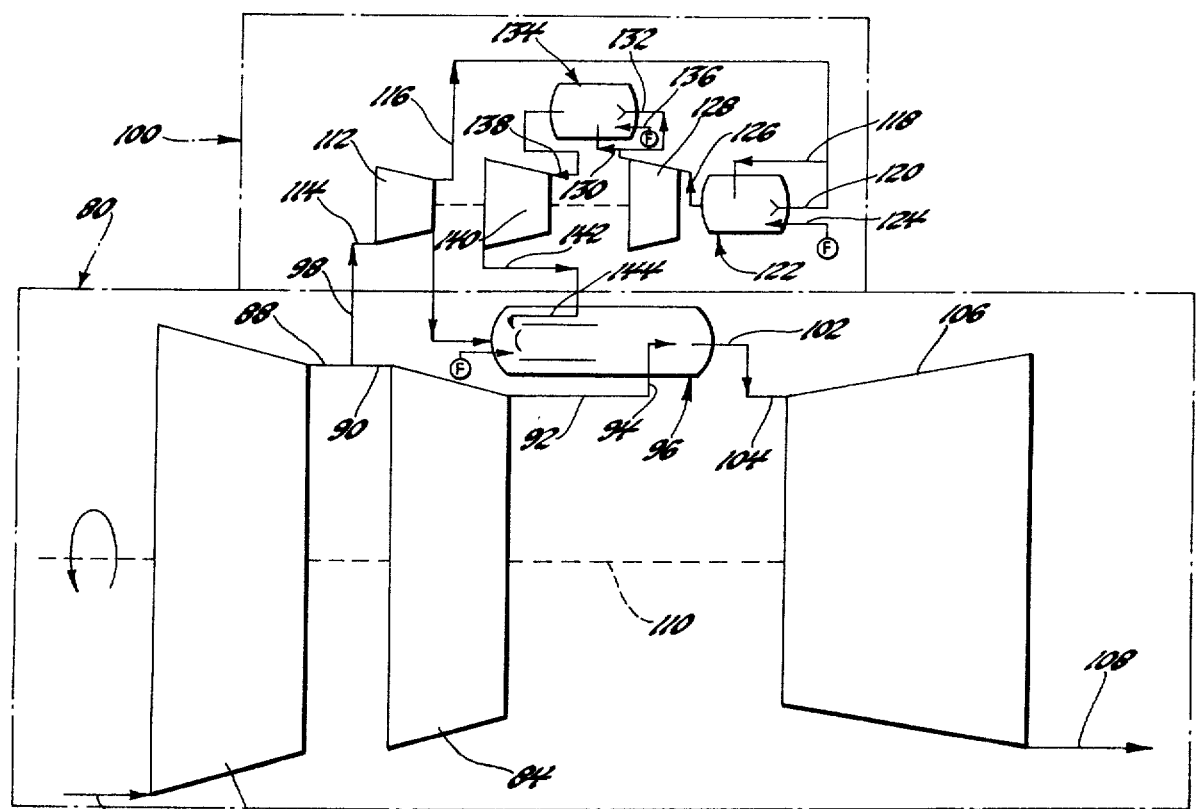

In the Drawing:

FIG. 1 is a diagrammatic view of a turbine engine cycle including an auxiliary gasifier engine to provide primary combustion air to the main engine; and FIG. 2 is a diagrammatic view of another embodiment of the turbine engine cycle including an auxiliary gasifier engine for providing primary combustion air to a main engine including a reheat cycle.

As illustrated in FIG. 1, a main turbine engine 10 is illustrated including first compressor stages 12 having an inlet 14 and an outlet 16. The outlet 16 from the first compressor stages 12 is in communication with an air bleed 18 and is also in communication with an inlet 20 to second compressor stages 22 having an outlet 24 thereof connected to an inlet 26 to a secondary combustion zone 28 of a main engine combustor 30.

The main engine combustor 30 includes a fuel nozzle 32 and a primary air supply nozzle 34 directing an air-fuel mixture into a primary combustion zone 36 upstream of the secondary combustion zone 28.

The output from the combustor 30 is directed through conduit means 38 to the inlet 40 of a main engine turbine 42 having an outlet 44 and being operatively connected to the first and second compressor stages 12, 22 by shaft means 44.

In order to improve combustion of air-fuel mixtures in combustor devices shown at 30 in the illustrated embodiment of FIG. 1, it is desirable to obtain a high ratio of recirculation air to primary air in the combustion zones 28, 36. In the past, pumping jets in communication with the main compressor stages have been utilized to enhance recirculation of air and fuel in a combustor. However, this produces momentum losses in the main air flow through the compressor.

In accordance with the present invention, an auxiliary engine 48 is associated with the main engine 10 and is operative to supply combustion gases to the combustor 30 at a total pressure higher than the main engine compressor discharge pressure thereby to produce an energy source for improving recirculation of combustion gases and fuel in the combustor 30 without producing undesirable momentum losses of the main air flow stream through the engine 10.

The system is applicable to all types of air breathing turbine engines, for example, turbojets, turbofan, turboshaft, turboprop and other like engines. Also, the auxiliary engine 48 may be a pulse jet, reciprocating engine, or turbine engine.

In the embodiment of FIG. 1, the auxiliary engine 48 includes a compressor stage 50 having an inlet 52 in communication with the bleed 18 and outlet 54 thereof connected to a primary air inlet 56 of a combustor 58. A secondary air supply 60 is directed into the combustor 58 as well as a fuel supply 62. Combustion products from the combustor 58 are directed through an outlet 64 to the inlet 66 of a turbine 68 that is coupled by means of a shaft 70 to the compressor stage 50.

The compressor 50 further includes an outlet 72 therefrom connected to the primary air inlet 34 of the combustor 30. This bleed of a small amount of auxiliary engine compressor discharge air flow may be omitted. However, in some cases, it may be an advantage to produce an air blast fuel atomization or further recirculation of air and fuel in the main engine combustor 30.

Primary control of recirculation in the combustor 30 is produced by directing the outlet 74 from the turbine 68 to an inlet 76 adjacent a passage 78 around the primary combustion zone 36 through which recirculation occurs from the secondary combustion zone 28 for mixing with the fuel supply in the primary combustion zone 36.

As shown in the system of FIG. 1, the air flow path includes entrance of air at the initial compressor stage 12 at inlet 14. At an intermediate point in the main engine compressor between compressor stages 12 and 22, a fraction of the main engine air flow is bled off to the inlet of the auxiliary engine compressor 50. The remaining main engine air flow passes through the high pressure stages 22 or the main compressor and emerges at the inlet 26 to the secondary combustion zone 28. Bleed air which passes through the auxiliary compressor 50 emerges at outlet 54 and is heated in the auxiliary combustor 54 prior to entering the auxiliary turbine 68. The auxiliary turbine supplies shaft power to drive the auxiliary compressor 50. Hot gases emerging from the auxiliary turbine 68 re-enter the engine at passageway 78 to produce recirculation of air from the secondary zone 28 to the primary zone 36. Air flow, not bled from the main engine compressor at 18 is discharged at 24 to enter the main combustor 30 downstream of the primary zone 28 and fulfills the role of dilution air in a conventional air combustor. In the dilution or secondary zone 28, the main bleed air and main air flow mix and enter the main turbine at the inlet 40 thereto. The combined air flow then passes to the main turbine 42 to the outlet 44 therefrom.

In order to function efficiently, the pressure ratio of the auxiliary compressor 50 must be higher than that of the main engine compressor stages past the bleed 18 by approximately the pressure ratio across the auxiliary turbine 68. The pressure point at which the bleed air 18 is taken from the main stream can be completely variable. The possibilities range from entering the auxiliary compressor at the inlet thereof, thus bypassing the main compressor completely, to entering the system at the outlet 24 from high pressure of 22 of the compressor. In the former case, at the inlet of the compressor, the pressure ratio requirements for the auxiliary compressor would be quite high for most applications. In a case where the bleed is taken from the outlet from the high pressure stages 22 of the compressor, the overall pressure ratio across the auxiliary engine (turbine 68 and compressor 50) would be approximately unity. In accordance with the present invention, it is also possible to use multiple bleed points and/or multiple auxiliary engines. In all cases, the same basic considerations as enumerated above apply.

As pointed out above, a small amount of the air from the auxiliary compressor 50 can be bled through an outlet 72 therefrom to provide an air flow to the primary zone 34 for air blast fuel atomization. Both the auxiliary engine air flow returning from the discharge 74 of auxiliary turbine 68 and that bled directly through the outlet 72 tend to enhance recirculation in the main engine combustor. It may be desirable, however, to produce all the recirculation function from the auxiliary engine return flow from the outlet 74 of turbine 68. This effectively establishes the recirculation ratio of the main combustor 30 directly under the control of the auxiliary engine fuel flow through nozzle 62.

By virtue of the aforedescribed system, massive effective recirculation can be obtained in a main combustor 30 of a gas turbine engine without excessive pressure loss penalties. In fact, in an exaggerated case, the stagnation pressure of the main air flow could be increased by mixing it with an auxiliary stream of higher specific momentum. This does not represent any penalty to the shaft power of the main turbine at a given inlet temperature because the auxiliary engine is self-sustaining. This is because the main turbine output is independent of the source of its air flow so long as the inlet temperature and pressure thereof are constant.

If for example, in the case of a simple turbojet, the turbine inlet temperature is fixed at an optimum valve, based on specific fuel consumption, the independent effect of adding an auxiliary engine is to reduce the main engine compressor work requirements and to increase the inlet pressure of the main engine turbine. Both of these results tend to improve the main engine specific fuel consumption.

Furthermore, the main engine compressor power input is reduced because the bleed flow reduces the air flow through the main engine compressor sections, the main engine turbine inlet pressure is increased because the jet pumping of the auxiliary flow at 79 in combustor 30 tends to reduce the pressure drop across the main combustor.

For the same main turbine air flow, the increased inlet pressure and reduced shaft work extraction results in a higher jet nozzle pressure ratio which can be used to increase thrust.

In the aforedescribed case, the only penalty to the main engine cycle is that the heat equivalent of the reduction in compressor shaft work must be replaced by the auxiliary combustor. Since a direct exchange of heat as provided by the combustor 58 produces equal potential work, the proposed cycle can have lower specific fuel consumption than in optimized simple turbojets.

The aforesaid system depends, of course, on the existence of an optimum turbine inlet temperature for the turbojet and the capability of the auxiliary engine to produce air flow of higher specific momentum than the main engine compressor discharge air flow without requiring the inlet temperature of the main turbine to increase. This requires that high component losses within the auxiliary engine must be maintained within desired limits.

In the embodiment of FIG. 2, a main turbine engine 80 is illustrated including a compressor having first stages 82 therein and second high pressure stages 84. There is an inlet 86 to compressor stages 82 for air flow to the engine 80. An outlet 88 from the first stages 82 is connected to an inlet 90 to the second stages. An outlet 92 thereof is connected to a secondary air supply 94 to a main engine combustor 96. An air bleed 98 between the outlet 88 and inlet 90 directs air bleed to an auxiliary engine 100 of the type shown at 48 in the first embodiment but including a reheat capability in the auxiliary engine cycle.

Combined flow from the auxiliary engine 100 and the compressor stages 82, 84 are returned from the combustor 96 through an outlet 102 to an inlet 104 of a turbine 106 with an outlet 108.

The turbine 106 supplies shaft power through shaft means 108 for the compressor stages 82, 84.

The auxiliary engine 100 includes an auxiliary compressor 112 having an inlet 114 in communication with the bleed 98 and a first outlet 116 connected to secondary air 118 and a primary air inlet 120 to a first auxiliary engine combustor 122. Fuel from a supply 124 and air are mixed in the auxiliary combustor 122 to produce heating of the air supply from the auxiliary compressor 122 which is directed to the inlet 126 of a first turbine stage 128. Discharge from the turbine stage 128 is directed through a secondary supply 130 and a primary supply 132 of a reheat combustor 134 having a fuel supply 136 thereto. The effect of reheat in the auxiliary engine 100 is to cause a further reduction in shaft work input to the main engine compressor stages 82, 84. The reheat gases are directed to the inlet 138 of an auxiliary engine second turbine 140 having the outlet 142 thereof connected to a recirculation air flow system 144 in the main compressor 96 like that in the first embodiment. The increased temperature produced by the reheat combustor 134 tends to reduce the amount of fuel which must be added in the main engine combustor for the same inlet temperature to the main turbine 106. The effect of the reheat in the auxiliary engine 100 thus results in no difference in exit temperature from the main turbine as compared to a case without reheat as illustrated in FIG. 1. Therefore, there is no change in propulsive efficiency for the overall cycle due to any changes in exit temperature. However, there will be a higher jet nozzle pressure ratio and therefore, an increased overall propulsive thrust. The fuel flow to the overall system would be unchanged if the main engine turbine inlet temperature is unchanged.

An increase in thrust without an increase in fuel flow decreases overall specific fuel consumption. Therefore, the addition of an auxiliary engine 100 with reheat results in an additional cycle improvement over adding an auxiliary engine which operates on the basis of a simple Brayton cycle as illustrated in FIG. 1.

There is no definite implied optimum size ratio between the auxiliary and main engines of the embodiments of the invention set forth above. Clearly, it would be desirable to make the auxiliary engine large enough to make a maximum reduction in the compressor work of the main engine. Additional functional advantages may result from incorporation of an auxiliary engine of the above type to improve air-fuel mixing in the main combustor of a main engine. The auxiliary engine could be used to start the main engine thus reducing starter size requirements. Furthermore, the main engine combustor could be shut down at idle. This could result in an improved effective "turn down" ratio since the higher pressure of the auxiliary combustion chamber and higher space heat release, when it operates alone, will widen system blow out limits.

The continuous bleed of the main compressor could eliminate the need for interstage compressor bleed valves for starting the main engine. Also, since compressor losses tend to accumulate near the compressor stage blade tips, removal (by bleed) in the tip boundary layer flow of the main compressor by, for example, a continuous radial step slot, would tend to increase the apparent efficiency of the main compressor.

The auxiliary engine also can be used to supply shaft power for accessory drives.

If the optimum turbine inlet temperature of the auxiliary engine is higher than that of the main engine, the accessory power theoretically can be produced at higher thermodynamic efficiency than would be produced off the main engine. This will produce an additional, although slight, improvement in the systems specific fuel consumption.

Further advantages possibly attributable to the above arrangement is that the improved recirculation pattern produced by the re-entry of turbine gases may reduce or eliminate the need for recirculation in the main engine combustor. This would shorten the overall length of the main combustor and result in-savings in structural weight and drag associated with the length of the main engine components. If the specific output of the main engine can be increased, the saving in main engine weight can offset the weight of the auxiliary engine.

As far as reliability is concerned, the main engine combustor could be designed to operate with the auxiliary engine shut down. The presence of hot gases from the auxiliary engine can contribute an enhanced resistance to flame out in the main engine combustor with the main engine combustor shut down for example due to failure of a fuel pump, and with the main engine rotor turning and the auxiliary engine running, the overall system still will have a useful output depending on the relative size of the auxiliary engine.

While the embodiments of the present invention, as herein disclosed, constitute a preferred form, it is to be understood that other forms might be adopted.

What is claimed is:

1. An emission control system for a gas turbine engine of the type including a main air compressor having multiple stages, a combustor including a primary air inlet, a combustion section and an outlet supplying combustion gases to a drive turbine comprising: an auxiliary engine compressor having an inlet and an outlet, means for directing bleed air from an intermediate stage in a main compressor of a gas turbine to the inlet of said auxiliary engine compressor, said auxiliary engine compressor having a pressure ratio from the inlet to the outlet thereof in excess of the pressure ratio from the intermediate stage of the main compressor to the outlet thereof, auxiliary combustor means receiving air from said auxiliary engine compressor, means for supplying fuel to said auxiliary combustor means, means for directing combustion products from said auxiliary combustor means, auxiliary turbine means driven by the combustion products from said auxiliary combustor, said auxiliary turbine having a pressure ratio thereacross approximately equal to the difference between the pressure ratio across the auxiliary compressor and the pressure ratio from the intermediate stage of the main compressor to the outlet thereof, means driven by said auxiliary turbine means to supply power to said auxiliary compressor, means for directing exhaust gases from said auxiliary turbine means to the combustion section of the gas turbine engine and means within the combustion section to direct said exhaust gases therethrough for producing a recirculation of air flow therein to mix air-fuel therein to produce an improved combustion of fuel components therein.

2. A gas turbine engine including a main engine compressor having an inlet and an outlet, means for bleeding a fraction of air from the main engine compressor, an auxiliary engine compressor having the inlet connected to the main engine air flow bleed means and an outlet, means defining an auxiliary combustor for receiving the compressed air bleed flow from the auxiliary compressor, an auxiliary turbine coupled to the auxiliary compressor, said auxiliary turbine having an inlet connected to the output of said auxiliary combustor, a main combustor means having a primary combustion section and a secondary zone therein, the output from said auxiliary turbine being directed to said primary combustion section, the outlet of said auxiliary air compressor supplying primary air to the main combustor means, said main combustor having recirculating means receiving combustion products from said auxiliary turbine for mixing air and fuel in said main combustor means, said main compressor having an outlet therefrom in communication with the secondary zone of the main combustor means downstream of the primary combustion section therein to provide dilution air in the secondary zone of the main combustor means, a main turbine, means for directing the combustion products from the main combustor means to the inlet of the main turbine to provide a power supply for said main compressor, said auxiliary compressor having a pressure ratio thereacross higher than the pressure ratio of the main engine compressor stages from the bleed by approximately the ratio across the auxiliary turbine to produce a positive flow of recirculating gas supply in the main combustor primary zone, said outlet of said auxiliary engine compressor being directed to the primary zone of the main combustor to produce air blast fuel atomization within the primary zone to enhance recirculation of secondary air flow in the main engine combustor.

3. A gas turbine engine combination comprising: a main compressor having multiple stages and an inlet and an outlet, a main turbine power turbine for driving said main compressor, a main combustor including a primary combustion zone and a secondary combustion zone, means for directing the output of the main compressor to the secondary zone to the main combustor, means defining a bleed for air from an intermediate stage of the main compressor, a secondary compressor having an inlet connected to the bleed from the main compressor and an outlet therefrom, said secondary compressor having a compression ratio from the inlet to the outlet thereof in excess of the pressure ratio from the intermediate stage of the main compressor to the outlet thereof, an auxiliary combustor means receiving air from the outlet of said secondary compressor, a secondary turbine receiving output from said auxiliary combustor means to produce a power supply for said secondary compressor, reheat means for the exhaust from said secondary turbine, a third turbine driven by the reheat means at a higher temperature including an outlet therefrom, means connecting the outlet from said third turbine to the primary combustion zone of the main combustion chamber, said first and second turbines having a pressure drop thereacross approximately equal to the difference between the pressure drop across said secondary compressor and the pressure drop from the intermediate stage of the main compressor to the outlet thereof, means within said primary combustion zone to produce a recirculation of air flow therein by combustion products from said third turbine to mix secondary air flow from the output of the main compressor with a fuel supply to the primary combustion zone to improve combustion therein for reducing emissions from the main combustor, and means for directing the combustion gas from the main combustor to said main power turbine for driving said main compressor.

* * * * *